(12) United States Patent
Kwon

(10) Patent No.: US 9,524,662 B2
(45) Date of Patent: Dec. 20, 2016

(54) APPARATUS AND METHODS FOR DISPLAYING ON FLEXIBLE DISPLAY

(71) Applicant: Samsung Electronics Co., Ltd, Gyeonggi-do (KR)

(72) Inventor: Woo-Up Kwon, Seoul (KR)

(73) Assignee: SAMSUNG ELECTRONICS CO., LTD, Suwon-Si, Gyeonggi-Do (KR)

( * ) Notice: Subject to any disclaimer, the term of this patent is extended or adjusted under 35 U.S.C. 154(b) by 157 days.

(21) Appl. No.: 13/797,183

(22) Filed: Mar. 12, 2013

(65) Prior Publication Data

US 2013/0235008 A1 Sep. 12, 2013

(30) Foreign Application Priority Data

Mar. 12, 2012 (KR) .......................... 10-2012-0025117

(51) Int. Cl.
*G09G 3/20* (2006.01)

(52) U.S. Cl.
CPC ........ *G09G 3/20* (2013.01); *G09G 2320/0261* (2013.01); *G09G 2340/0464* (2013.01); *G09G 2380/02* (2013.01)

(58) Field of Classification Search
None
See application file for complete search history.

(56) References Cited

U.S. PATENT DOCUMENTS

| 5,931,764 A | 8/1999 | Freeman et al. | |
| 8,160,865 B1 * | 4/2012 | Coughlan et al. | 704/4 |
| 2004/0008191 A1 | 1/2004 | Poupyrev et al. | |
| 2005/0078217 A1 | 4/2005 | Hardt et al. | |
| 2005/0276164 A1 * | 12/2005 | Amron | G04C 3/002 368/82 |
| 2008/0291225 A1 * | 11/2008 | Arneson | 345/698 |
| 2010/0029327 A1 | 2/2010 | Jee | |
| 2010/0117975 A1 | 5/2010 | Cho | |
| 2011/0086680 A1 | 4/2011 | Kim et al. | |
| 2011/0187681 A1 * | 8/2011 | Kim et al. | 345/204 |
| 2013/0044215 A1 * | 2/2013 | Rothkopf et al. | 348/143 |
| 2013/0076612 A1 * | 3/2013 | Myers | 345/156 |

FOREIGN PATENT DOCUMENTS

| CN | 102141878 A | 8/2011 |
| EP | 2192750 A2 | 6/2010 |

(Continued)

OTHER PUBLICATIONS

Notice of Preliminary Rejection dated Jul. 11, 2013 in connection with Korean Patent Application No. 10-2012-0025117, 10 pages.

(Continued)

*Primary Examiner* — Nicholas Lee
*Assistant Examiner* — Duane N Taylor, Jr.

(57) ABSTRACT

An apparatus and method for displaying on a portable terminal is provided. The apparatus includes a display unit configured to display information at a display location on a screen, a sensor configured to provide motion information of the portable terminal when the portable terminal is bent, and a controller configured to adjust the display location on the screen based on the motion information. A method comprises displaying information at a display location on a screen, providing motion information of the portable terminal when the portable terminal is bent and adjusting the display location on the screen based on the motion information provided.

20 Claims, 10 Drawing Sheets

(56) References Cited

FOREIGN PATENT DOCUMENTS

| JP | 2001-034235 A | 2/2001 |
|---|---|---|
| JP | 2002-519754 | 7/2002 |
| JP | 2004-062267 | 2/2004 |
| JP | 2005-165129 | 6/2005 |
| JP | 2006-171412 | 6/2006 |
| JP | 2010-177740 | 8/2010 |
| JP | 2010-288272 | 12/2010 |
| KR | 10-2010-0050318 | 5/2010 |
| KR | 10-2011-0088872 | 8/2011 |
| WO | WO 2007/069116 A2 | 6/2007 |

OTHER PUBLICATIONS

International Search Report dated Jun. 26, 2013 in connection with International Patent Application No. PCT/KR2013/001972, 4 pages.
Written Opinion of the International Searching Authority dated Jun. 26, 2013 in connection with International Patent Application No. PCT/KR2013/001972, 8 pages.
Extended European Search Report dated Aug. 2, 2013 in connection with European Patent Application No. 13158794.1, 7 pages.
Notice of Preliminary Rejection dated Feb. 18, 2014 in connection with Japanese Application No. 2013-048878, 9 pages.
Notice of Patent Grant dated Jan. 10, 2014 in connection with Korean Application No. 10-2012-0025117, 6 pages.
Notice of Preliminary Rejection dated Dec. 2, 2014 in connection with Japanese Application No. 2013-048878; 5 pages.
Translated Chinese Office Action dated Jul. 3, 2015 in connection with Chinese Application No. 201310077609.4; 13 pages.
Translated Japanese Office Action dated Jul. 28, 2015 in connection with Japanese Application No. 2013-048878; 9 pages.
Notice of Preliminary Rejection dated Nov. 17, 2015 in connection with Japanese Patent Application No. 2013-048878; 7 pages.
Notice of Patent Grant dated May 31, 2016 in connection with Japanese Patent Application No. 2013-048878; 5 pages.
Second Office Action dated Mar. 17, 2016 in connection with Chinese Application No. 201310077609.4, 8 pages.

* cited by examiner

| ANGLE BY WHICH PORTABLE TERMINAL ROTATES IN AXIS X' WITH RESPECT TO GRAVITY DIRECTION | ON-SCREEN LOCATION (x, y),x(0~10),y(0~20) |
|---|---|
| ... | ... |
| −20° ~ −10° | (3,0) |
| −10° ~ 0° | (4,0) |
| 0° | (5,0) |
| 0° ~ 10° | (6,0) |
| ... | ... |

| ANGLE BY WHICH PORTABLE TERMINAL ROTATES IN AXIS Z' WITH RESPECT TO GRAVITY DIRECTION | ON-SCREEN LOCATION P(x, y),x(0~10),y(0~20) |
|---|---|
| ... | ... |
| −20° ~ −10° | (0,6) |
| −10° ~ 0° | (0,7) |
| 0° | (0,8) |
| 0° ~ 10° | (0,9) |
| ... | ... |

APPARATUS AND METHODS FOR DISPLAYING ON FLEXIBLE DISPLAY

CROSS-REFERENCE TO RELATED APPLICATION(S) AND CLAIM OF PRIORITY

The present application is related to and claims the benefit under 35 U.S.C. §119(a) of a Korean patent application No. 10-2012-0025117 filed on Mar. 12, 2012 in the Korean Intellectual Property Office, the entire disclosure of which is hereby incorporated by reference.

TECHNICAL FIELD OF THE INVENTION

The present disclosure relates to apparatus and methods for displaying on a portable terminal with a flexible display. More particularly, the present disclosure relates to apparatus and methods for displaying on a flexible display that is bent around.

BACKGROUND OF THE INVENTION

With the development of electronics communication industries, a portable terminal has become necessities of modern life as an important means for delivering information which changes rapidly.

Recently, with the development and popularity of a Graphic User Interface (GUI) system, the portable terminal uses a flexible display without satisfying with a touch screen. Since the flexible display is bendable, it contributes to lead a sector in which the conventional display faces a limitation. Examples of sectors that can utilize the flexible display include an e-book sector capable of replacing publication such as magazines, a new portable Information Technology (IT) product sector such as an ultra-compact Personal Computer (PC) that can be carried by bending or rolling a display thereof, a smart card capable of confirming information on a real-time basis and the like.

There is, therefore, a need for a method and an apparatus for displaying on a flexible display.

SUMMARY OF THE INVENTION

To address the above-discussed deficiencies of the prior art, it is a primary object to provide an apparatus and a method for displaying on a portable terminal with a flexible display by adjusting display location on a screen when the portable terminal is bent.

Another aspect of the present disclosure is to provide an apparatus and a method for displaying on a screen in which a user's field of vision is secured when the portable terminal is bent around.

In accordance with an aspect of the present disclosure, an apparatus for detecting that a portable terminal is bent is provided. The apparatus includes an engagement unit configured to provide an engagement signal to a controller when a first end of the portable terminal is engaged with a second end of the portable terminal, and the controller configured to detect that the portable terminal is bent upon receiving the engagement signal provided from the engagement unit.

In accordance with another aspect of the present disclosure, an information display apparatus of a portable terminal is provided. The apparatus includes a display unit configured to display at a display location on a screen, a sensor configured to provide motion information of the portable terminal when the portable terminal is bent, and a controller configured to adjust the display location based on the motion information provided from the sensor.

In accordance with another aspect of the present disclosure, an information display apparatus of a portable terminal is provided. The apparatus includes a display unit configured to display at a display location on a screen, a first sensor configured to provide a signal reporting that the portable terminal is bent, a second sensor configured to provide motion information of the portable terminal upon receiving from the first sensor the signal reporting that the portable terminal is bent, and a controller configured to adjust the display location based on the motion information provided from the second sensor.

In accordance with another aspect of the present disclosure, a method of detecting that a portable terminal is bent is provided. The method includes providing an engagement signal when a first end of the portable terminal is engaged with a second end of the portable terminal, and detecting that the portable terminal is bent upon receiving the provided engagement signal.

In accordance with another aspect of the present disclosure, a method of displaying information of a portable terminal is provided. The method includes displaying information at a display location on a screen, providing motion information of the portable terminal when the portable terminal is bent, and adjusting the display location based on the motion information provided.

In accordance with another aspect of the present disclosure, an information display method of a portable terminal is provided. The method includes displaying information at a display location on a screen, providing a signal reporting that the portable terminal is bent, providing motion information of the portable terminal upon receiving the provided signal reporting that the portable terminal is bent, and adjusting the display location on the screen based on the motion information provided.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged flexible electronic device. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein must be understood based on the descriptions made herein.

The present disclosure provides a method and apparatus for displaying information on a portable terminal which adjust a display location on a screen such that a user's field of vision is secured when the portable terminal is bent to be worn on the wrist.

According to an exemplary embodiment of the present disclosure, the portable terminal can be deformed in bending, folding, distorting, curving and the like. For example, the portable terminal can be rolled in a scroll fashion and can be curved (or bendable) like paper. The portable terminal includes a flexible display that is deformable. In addition, according to the exemplary embodiment of the present disclosure, the portable terminal is wearable on a body part such as a wrist or the like and has a structure described below.

Figure 1:
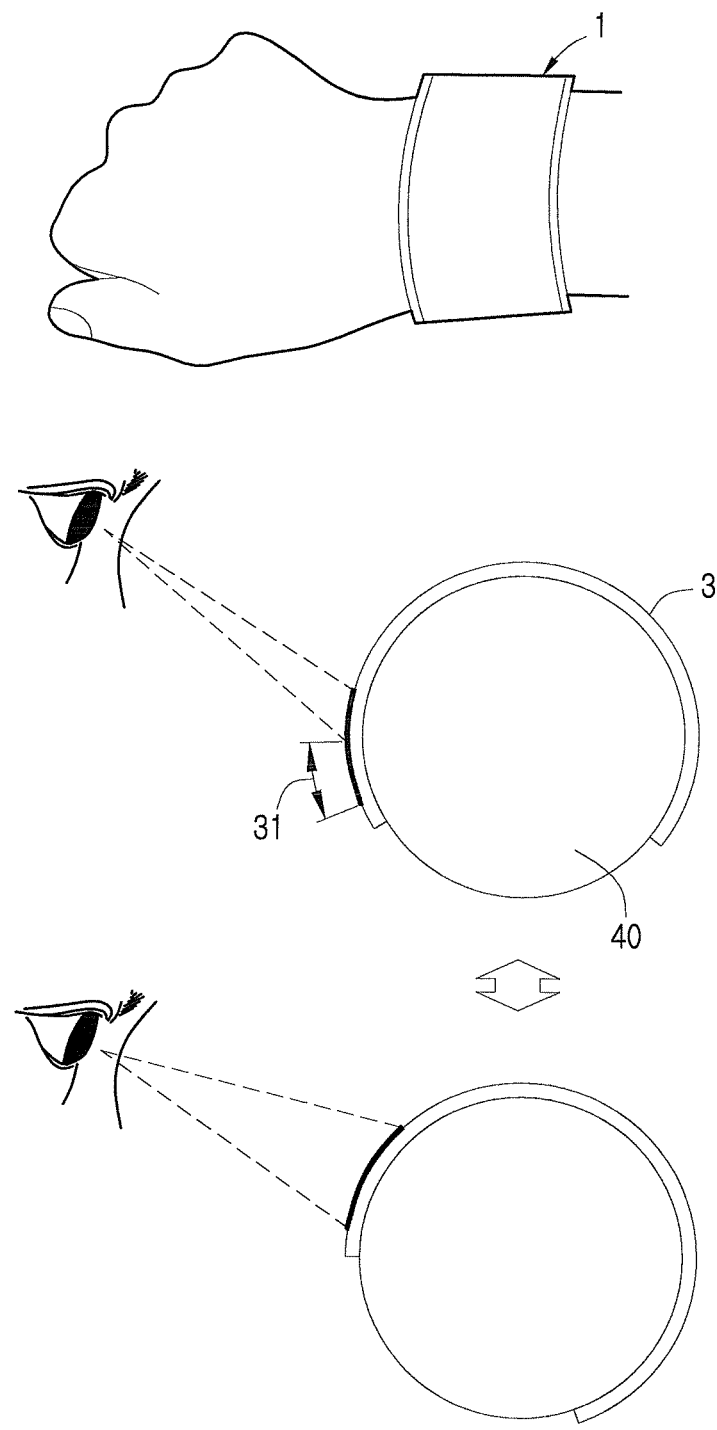
FIG. 1 illustrates that a portable terminal employing a flexible display is worn on a wrist according to an exemplary embodiment of the present disclosure.

FIG. 1 illustrates that a portable terminal employing the flexible display is worn on a wrist. Referring to FIG. 1, a portable terminal 1 is bent to wrap a user's wrist. In general, a user watches a flexible display 3 as if the user watches a wrist watch. Since a screen is bent, the user can turn a wrist 40 on which the portable terminal 1 is worn in order to see information 31 located beyond a field of vision.

Figure 2:
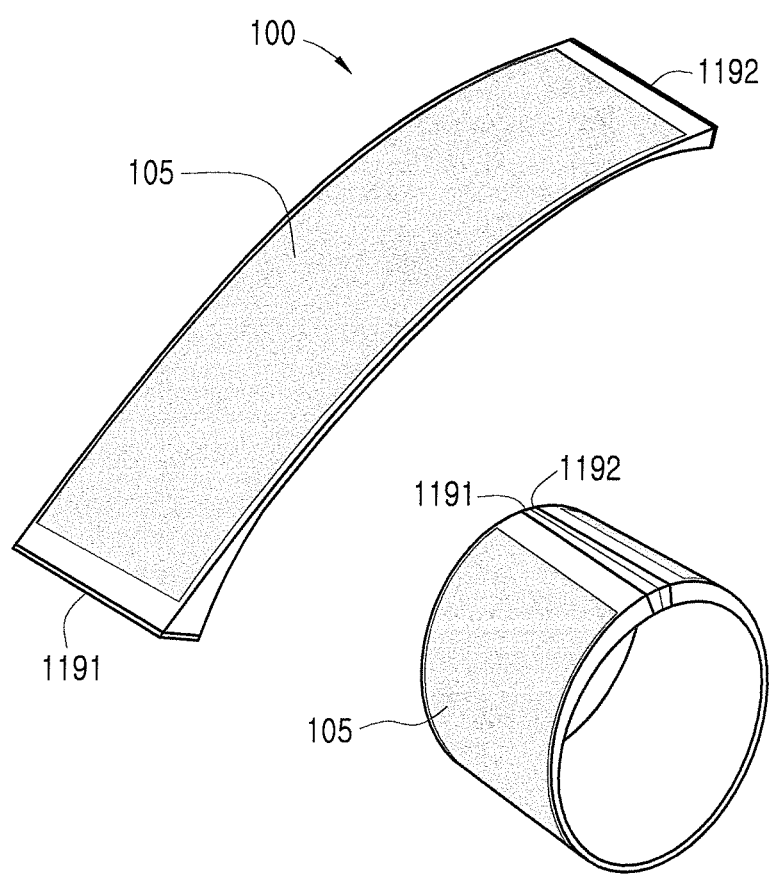
FIG. 2 is a perspective view of a portable terminal according to an exemplary embodiment of the present disclosure.

FIG. 2 is a perspective view of a portable terminal according to an exemplary embodiment of the present disclosure. Referring to FIG. 2, a portable terminal 100 is bent around when both ends 1191 and 1192 are engaged. The portable terminal 100 can include a flexible display 105 that provides a bendable screen. The portable terminal 110 includes an engaging unit at the both ends 1191 and 1192, which will be described below with reference to FIG. 3 and FIG. 4.

Figure 3:
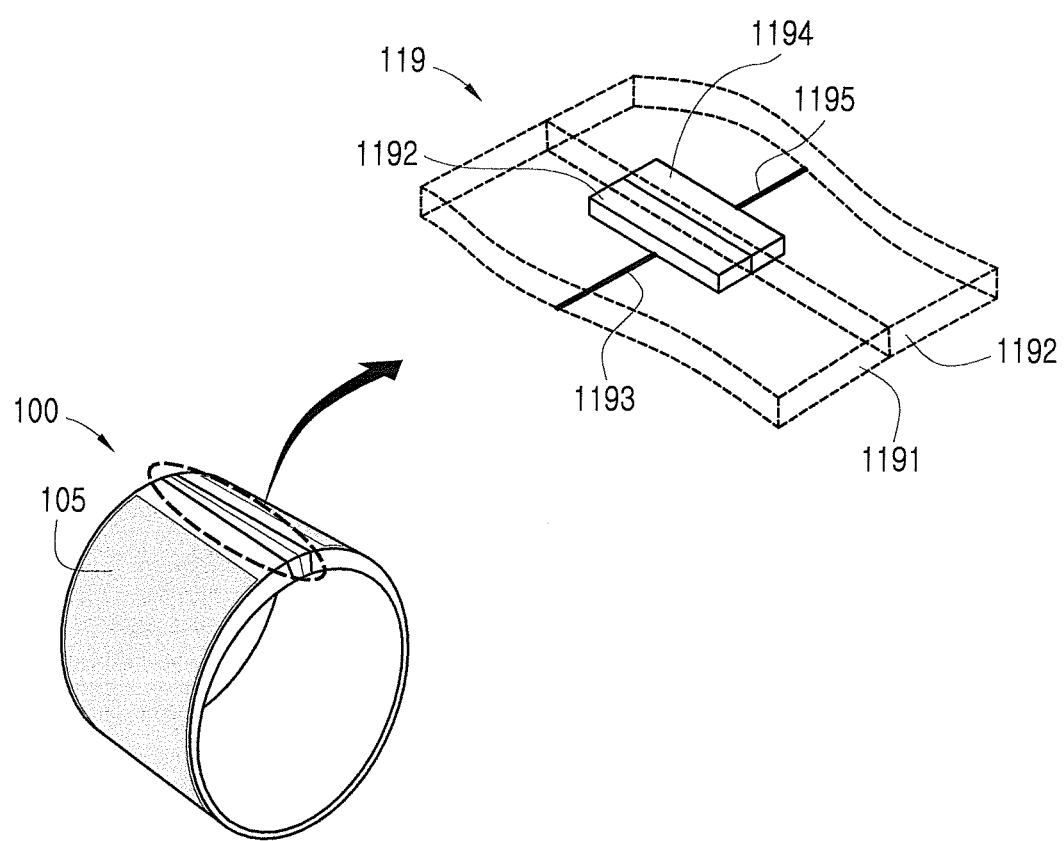
FIGS. 3 and 4 illustrate an engagement unit for wearing a portable terminal on a wrist according to an exemplary embodiment of the present disclosure.
Figure 4:
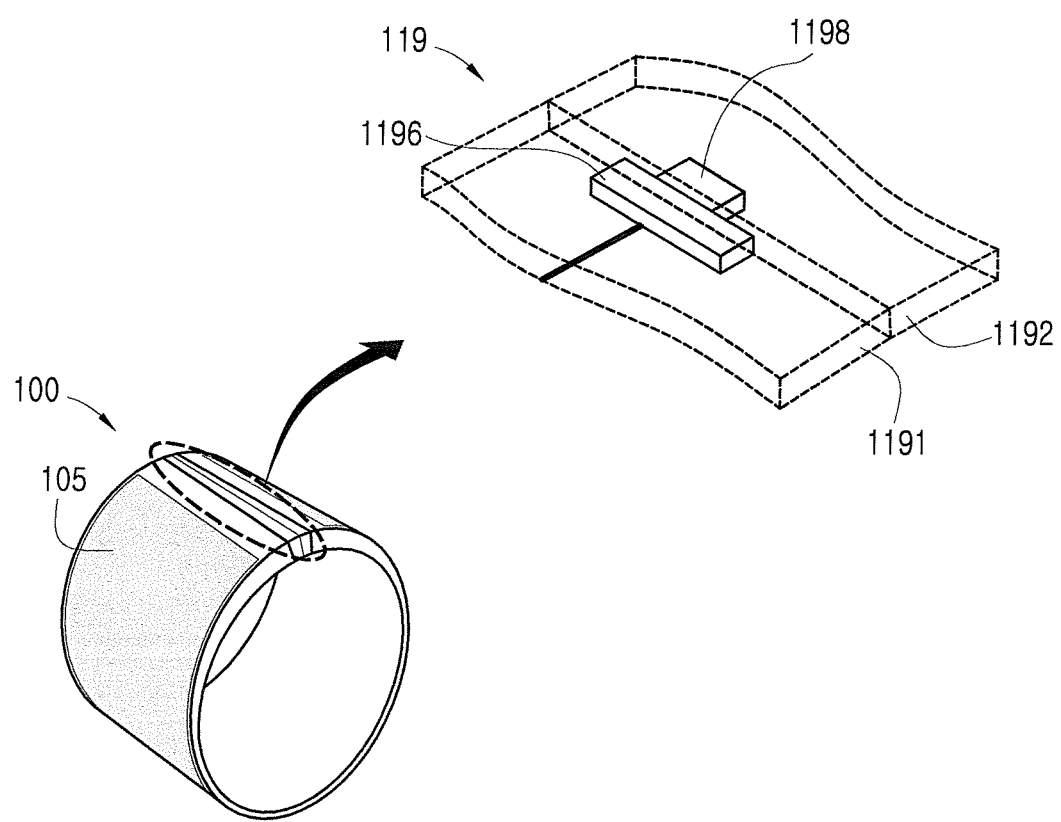

FIG. 3 and FIG. 4 illustrate a portable terminal worn on a wrist according to an exemplary embodiment of the present disclosure. The portable terminal 100 includes an engagement unit 119 for engaging the both ends 1191 and 1192. The engagement unit 119 has a mechanical and electrical structure. In particular, the portable terminal 100 can detect that the both ends 1191 and 1192 are engaged by means of the engagement unit 119. Referring to FIG. 3, the first end 1191 includes a male connector 1192 connected to a first circuit 1193, and the second end 1192 includes a female connector 1194 connected to a second circuit 1195.

When the first end 1191 and the second end 1192 are engaged, the male connector 1192 and the female connector 1194 are electrically connected and thereby the first circuit 1193 and the second circuit 1195 are connected each other, which is detected by the portable terminal 100. Referring to FIG. 4, the first end 1191 includes a switch 1196, and the second end 1192 includes a member capable of turning on the switch. When the first end 1191 and the second end 1192 are engaged, the switch 1196 turns on, which is detected by the portable terminal 100. Alternatively, the first end 1191 includes a sensor such as a proximity sensor, a magnetic sensor or a photo sensor, and the second end 1192 includes a member 1198 to trigger the sensor. When the first end 1191 and the second end 1192 are engaged, the member triggers the sensor, which is detected by the portable terminal 100.

When the first end 1191 and the second end 1192 are engaged, the portable terminal 100 is bent around. When the portable terminal 100 is bent, even if the portable terminal rotates, information on the screen is moved control so that a user's field of vision is secured.

Figure 5:
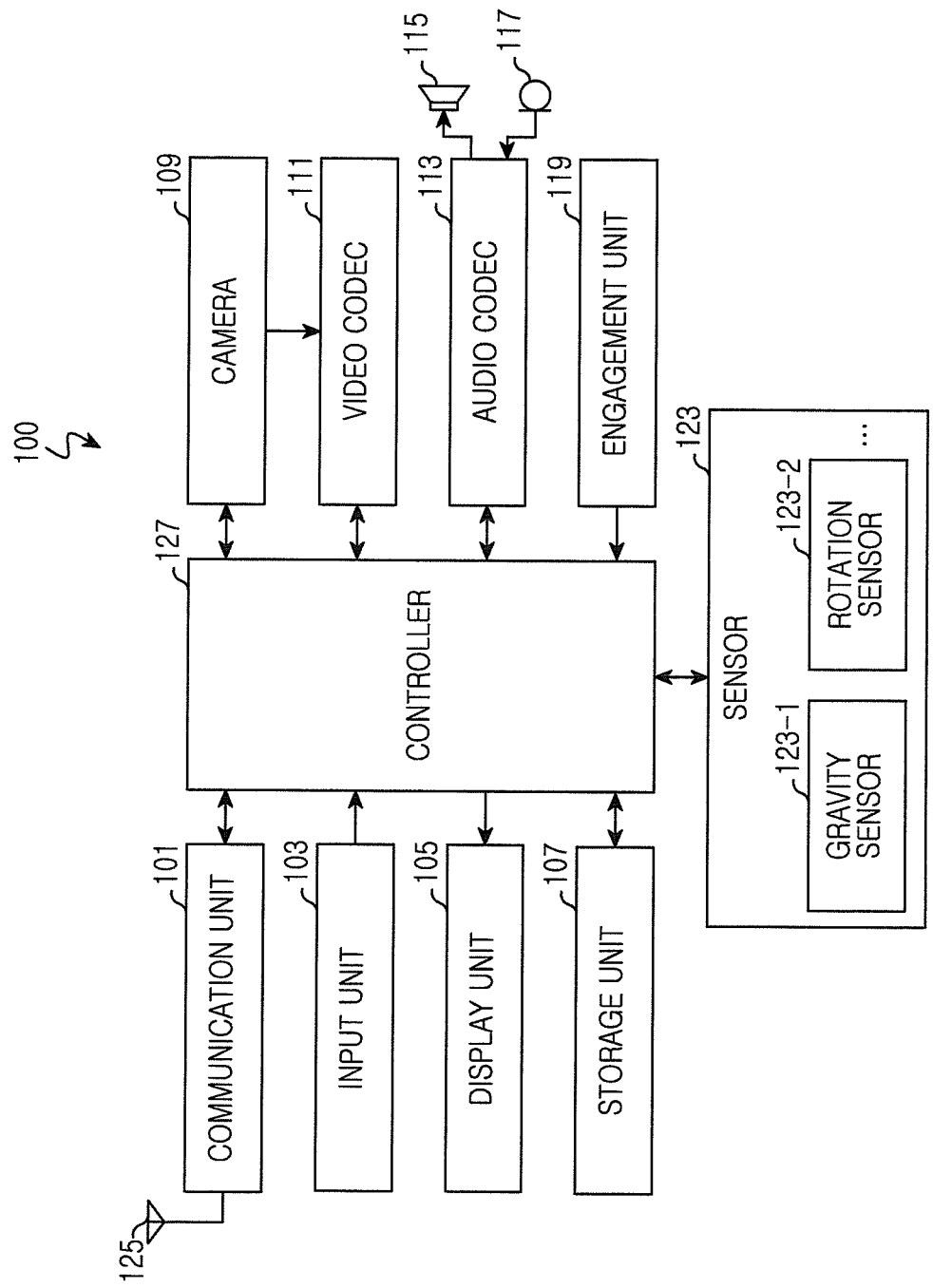
FIG. 5 is a very high level of block diagram of a portable terminal according to an exemplary embodiment of the present disclosure.

FIG. 5 is a high level block diagram of a portable terminal according to an exemplary embodiment of the present disclosure. Referring to FIG. 5, a portable terminal 100 includes a communication unit 101, an input unit 103, a display unit 105, a storage unit 107, a camera 109, a video codec 111, an audio codec 113, a speaker 115, a microphone 117, an engagement unit 119, a sensor 123, an antenna 125 and a controller 127.

The portable terminal 100 can be deformed. For example, the portable terminal 100 can be rolled or curved (or bendable) like paper. For the flexibility, at least one of the aforementioned elements is deformable. In particular, the display unit 105 includes a flexible display.

The portable terminal 100 includes a cellular phone, a Personal Communication System (PCS), a Personal Data Assistant (PDA), an International Mobile Communication-2000 (IMT2000) terminal, a fourth-generation broadband system terminal and the like.

The communication unit 101 has a hardware and a software structures which enable video communication, audio communication and data communication. The communication unit 101 transmits and receives a radio signal through the antenna 125.

The input unit 103 receives a user input, and provides the controller 127 with an input signal corresponding to the user input.

The display unit 105 displays visual data under the control of the controller 127, which was demodulated by means of the video codec 111.

The storage unit 107 stores a program for controlling an overall operation of the portable terminal 100 and a variety of data which is input and output when a control operation of the portable terminal is executed.

The camera 109 generates image data by capturing an object, and displays the generated data to the video codec 111.

The audio codec 113 modulates image data provided from the camera 109, and provides the modulated data to the controller 127. In addition, the audio codec 113 demodulates image data provided from the controller 127, and thereafter provides the demodulated data to the display unit 105.

The audio codec 113 modulates audio data provided from the microphone 117, and provides the modulated data to the controller 127. Further, the audio codec 113 demodulates the audio data provided from the controller 127, and thereafter provides the demodulated data to the speaker 115.

The engagement unit 119 has a mechanical and electrical structure which engages the both ends of the portable terminal 100. In particular, if the both ends are engaged, the controller 127 detects the engagement.

The sensor 123 detects a physical situation of the portable terminal 100, and reports the detected situation to the controller 127. For example, the sensor 123 includes a gravity sensor 123-1, a rotation sensor 123-2, an acceleration sensor, a Global Positioning System (GPS) sensor, a temperature sensor and the like.

The controller 127 processes and controls video communication, audio communication, and data communication. The controller 127 configures an execution environment of the portable terminal 100, maintains information thereof, allows the portable terminal 100 to reliably operate and facilitates data input/output exchanges for the portable terminal 100.

In particular, the controller 127 detects that the portable terminal 100 is bent around from the engagement unit 119, detects the motion of the portable terminal 100 by means of the sensor 123, and controls an on-screen location of the information so that the information displayed on the display unit 105 is not beyond the user's field of vision.

Figure 6:
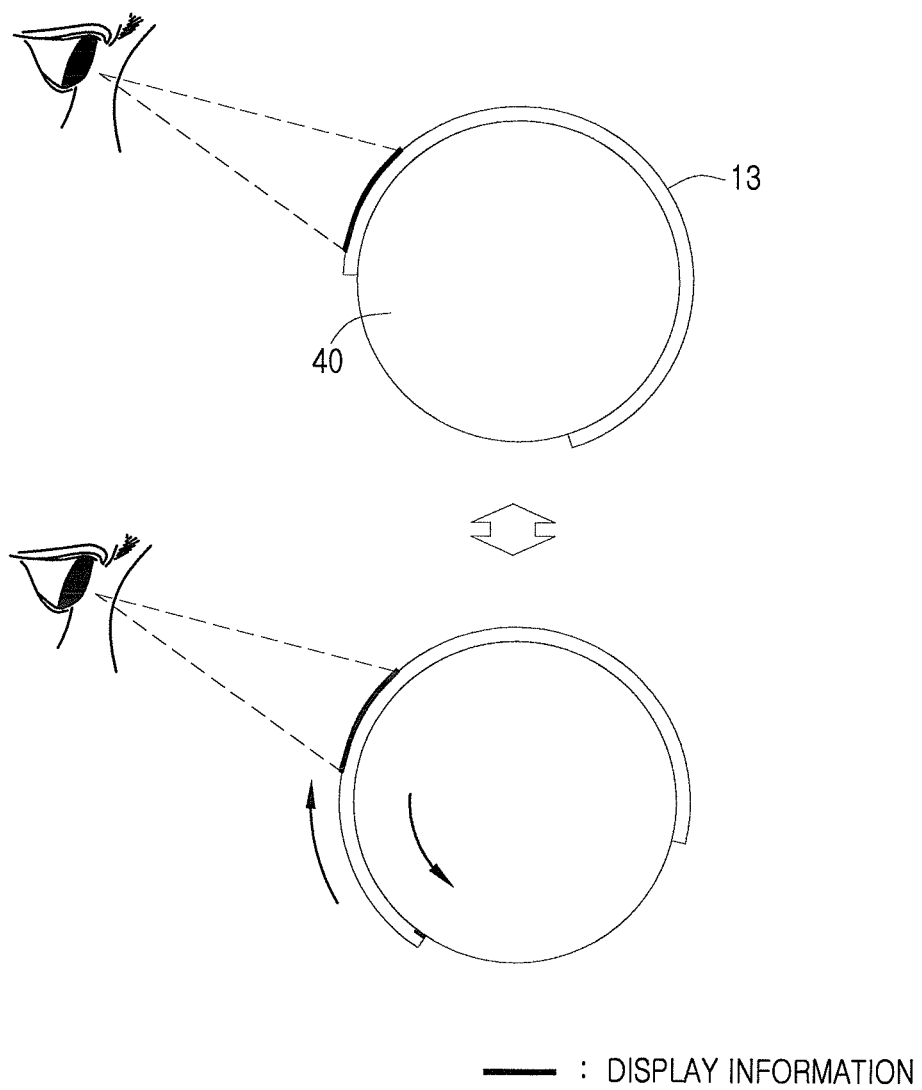
FIG. 6 illustrates a method for displaying information on a portable terminal according to an exemplary embodiment of the present disclosure.

FIG. 6 illustrates an information display method of a portable terminal according to an exemplary embodiment of the present disclosure. Referring to FIG. 6, visual information is displayed at an initial position in which a user's field of vision is secured. The display location adjusts on the motion of the portable terminal when, for example, the user turns a wrist 40 so that the user's field of vision is secured. As a result, the user can feel that the display information does not move on the screen despite the motion of the portable device, and thus the field of vision for the display information can be secured.

Figure 7:
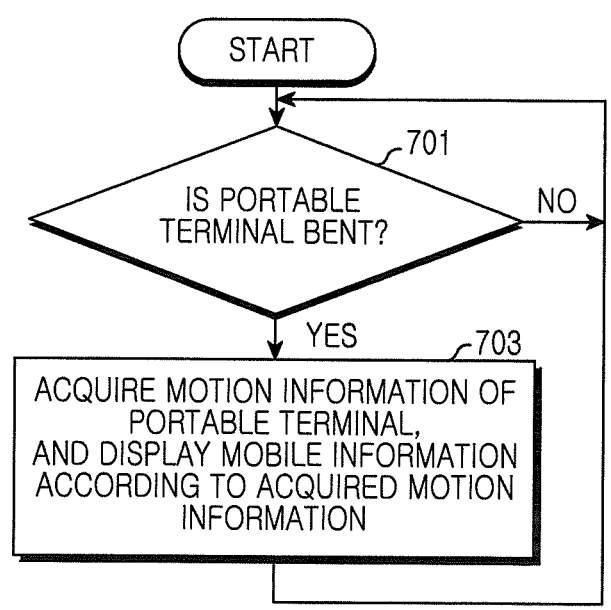
FIG. 7 is a flowchart illustrating a process for displaying information on a portable terminal according to an exemplary embodiment of the present disclosure.

FIG. 7 is a flowchart illustrating an information display process of a portable terminal according to an exemplary embodiment of the present disclosure. Referring to FIG. 7, the controller 127 determines whether the portable terminal 100 is bent by means of the engagement unit 119 (step 701).

When the portable terminal 100 is bent around, the controller 127 receives motion information (e.g., a rotation angle, a rotation direction, a rotation speed, elasticity, etc.) of the portable terminal 100 from the sensor 123, and displays information that can be adjusted according to the motion information (step 703). For example, the controller 127 determines an on-screen location corresponding to the motion information provided from the sensor 123 by consulting a database or adopting an arithmetic algorithm, and displays information at the determined on-screen location.

Further, the sensor 123 provides the controller 127 with a velocity at which the portable terminal 100 rotates, and the controller 127 adjust the display location on the screen at a velocity in proportion to the velocity provided from the sensor 123. In addition, the sensor 123 provides the controller 127 a direction in which the portable terminal 100 rotates, and the controller 127 adjusts the display location on the screen in opposite direction.

Figure 8:
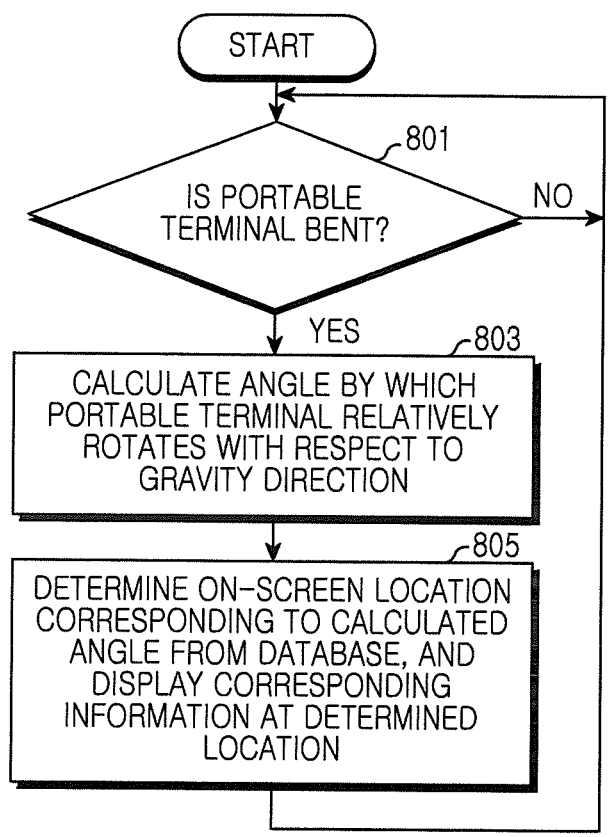
FIG. 8 is a flowchart illustrating a process for displaying information on a portable terminal according to an exemplary embodiment of the present disclosure.

FIG. 8 is a flowchart illustrating an information display process of a portable terminal according to an exemplary embodiment of the present disclosure. Referring to FIG. 8, the controller 127 determines whether the portable terminal 100 is bent around from the engagement unit 119 (step 801).

When the portable terminal 100 is bent around, the controller 127 receives from the gravity sensor 123-1 a gravity direction and an angle by which the portable terminal 100 is in motion with respect to the gravity direction (step 803).

Thereafter, the controller 127 determines a display location on a screen corresponding to the detected angle in the database, and displays information at the determined position on a screen (step 805). The database specifies display location on a screen for the angles by which the portable terminal rotates with respect to the gravity direction.

The information to display can be provided by various S/W applications, for example, a Short Message Service (SMS), a Multimedia Message Service (MMS), an e-mail, an application shortcut, a Social Network Service (SNS), an alarm, a software update and the like.

Figure 9:
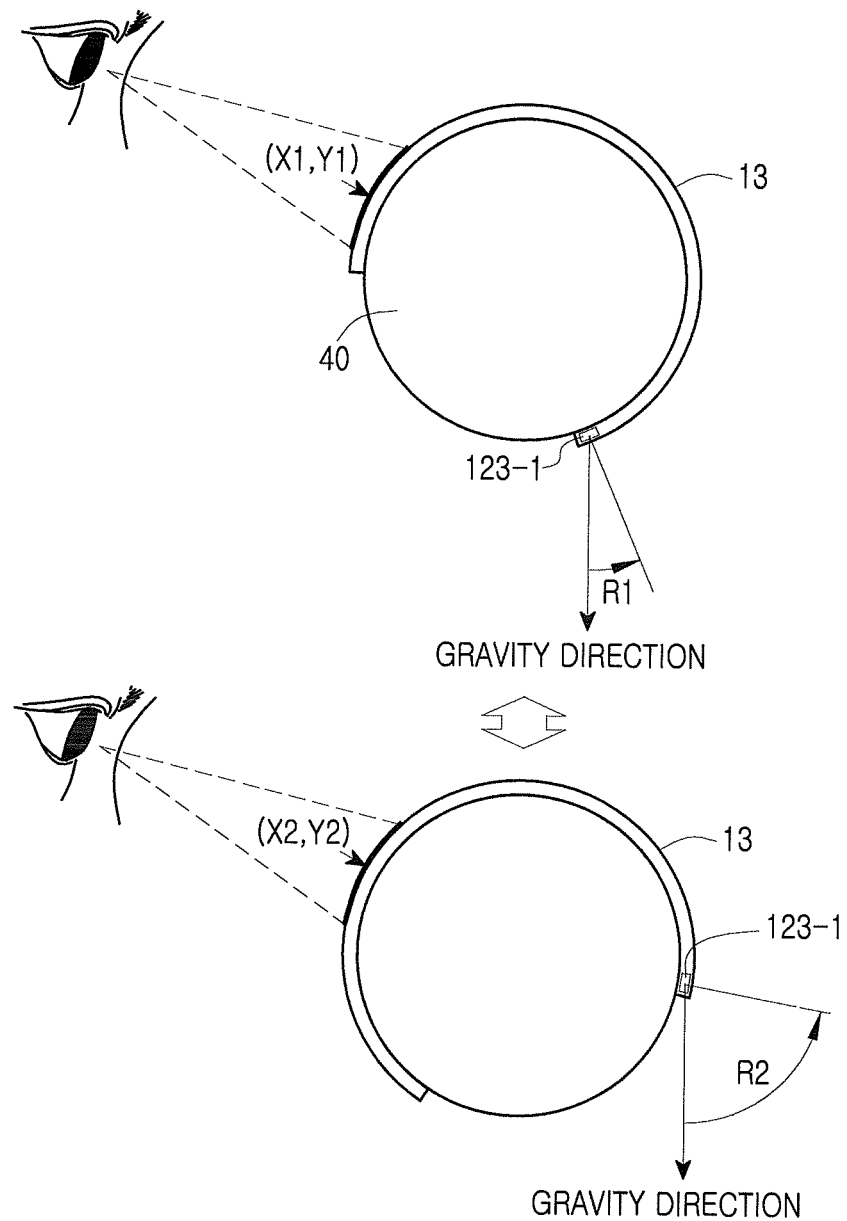
FIG. 9 illustrates adjusting a display location on a screen of a portable terminal according to an exemplary embodiment of the present disclosure.

FIG. 9 illustrates adjusting a display location on a screen of a portable terminal according to an exemplary embodiment of the present disclosure. Referring to FIG. 9, the controller 127 detects that the portable terminal 100 is bent over from the engagement unit 119, and receives from the gravity sensor 123-1 a gravity direction and an angle R1 by which the portable terminal 100 rotates relatively with respect to the gravity direction. The controller 127 determines from the database the display location on a screen, 1 (X1, Y1), corresponding to the provided angle R1, and displays information at the determined location 1 (X1, Y1).

Thereafter, if a user turns a wrist, the controller 127 receives from the gravity sensor 123-1 the gravity direction and the angle R2 by which the portable terminal rotates relatively with respect to the gravity direction. The controller 127 determines from the database the display location on a screen, 2(X2, Y2), corresponding to the angle R2 received from the gravity sensor 123-1, and displays the information by adjusting the display location from 1 (X1, Y2) to 2 (X2, Y2).

Figure 10:
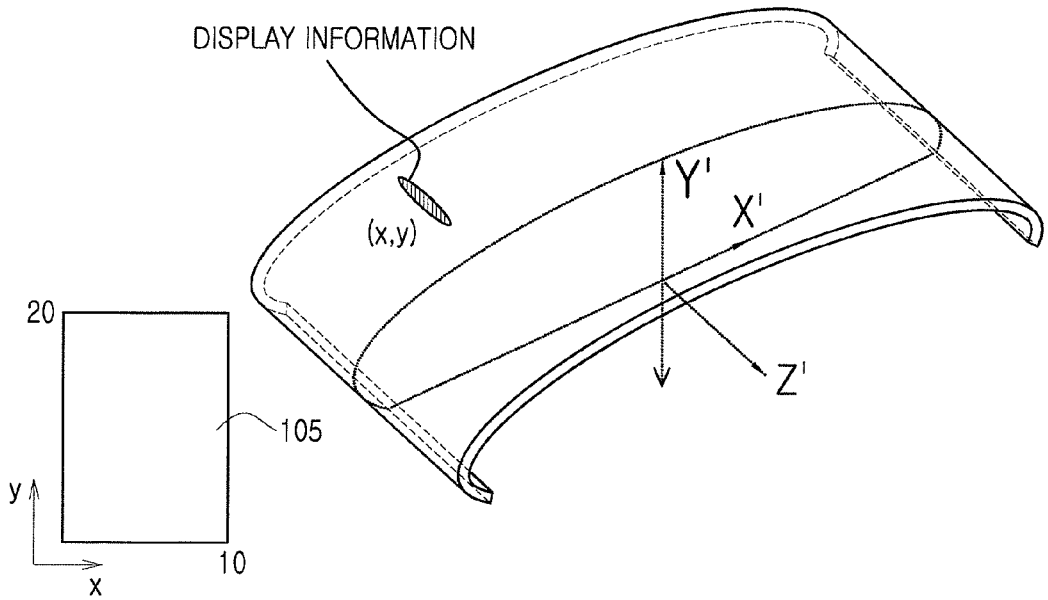
FIG. 10 illustrates determining a display position on a screen of a portable terminal according to an exemplary embodiment of the present disclosure.

FIG. 10 illustrates a method of determining a display location on a screen in a portable terminal according to an exemplary embodiment of the present disclosure. Referring to FIG. 10, the controller 127 receives from the gravity sensor 123-1 an angle by which the portable terminal 100 rotates in at least one or more directions with respect to the gravity direction. As illustrated, the controller 127 can receive from the gravity sensor 123-1 an angle by which the portable terminal rotates in an axis X', that is, rotates in left and right directions of the screen with respect to the gravity direction, and can determine from the database a coordinate x on the screen corresponding to the provided angle.

Further, the controller 127 can receive from the gravity sensor 123-1 an angle by which the portable terminal rotates in an axis Y', that is, rotates in the upward and downward directions of the screen with respect to the gravity angle, and can determine from the database a coordinate y on the screen corresponding to the provided angle.

In particular, the portable terminal 100 can store the database that provides a plurality of angle ranges and coordinates that are specified for each angle range. In addition, the controller 127 can configure an arithmetic algorithm for the database, and calculate a coordinate corresponding to an angle by which the portable terminal 100 rotates with respect to the gravity direction by using the arithmetic algorithm.

Methods based on the embodiments disclosed in the claims and/or specification of the present disclosure can be implemented in hardware, software, or a combination of both. When implemented in software, computer readable recording medium for storing one or more programs (i.e., software modules) can be provided. The one or more programs stored in the computer readable recording medium are configured for execution performed by one or more processors in an electronic device such as a portable terminal. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette.

Alternatively, the program can be stored in a memory configured in combination of all or some of these storage media. In addition, the configured memory can be plural in number. Further, the program can be stored in an attachable storage device capable of accessing the electronic device through a communication network such as the Internet, an Intranet, a Local Area Network (LAN), a Wide LAN (WLAN), a Storage Area Network (SAN), or a communication network configured by combining the networks. The storage device can access the electronic device through an external port. Furthermore, an additional storage device on the communication network can access a portable electronic device.

In conclusion, an information display method and apparatus of a portable terminal according to the present disclosure displays information at a location on a screen where a user easily watches when the portable terminal is bent around.

While the present disclosure has been particularly shown and described with reference to exemplary embodiments thereof, it will be understood by those skilled in the art that various changes in form and details may be made therein without departing from the spirit and scope of the present invention as defined by the appended claims.

What is claimed is:

1. A portable terminal comprising:
a flexible and rectangular display with four sides including opposite first and second sides, and opposite third and fourth sides;
an engagement unit comprising first and second ends respectively adjacent to the first and second sides, wherein the engagement unit is configured to provide an engagement signal to a controller when the first end is engaged with the second end and the portable terminal with the flexible display deformed into a curved shape;
a sensor configured to, when the first end is engaged with the second end and the portable terminal with the flexible display is deformed into the curved shape:
measure a tilt angle that the deformed portable terminal is tilted toward the third side or the fourth side; and
measure a rotation angle that the deformed portable terminal is rotated in a clockwise or counterclockwise with respect to a rolling motion with the curved shape of the portable terminal;
the controller configured to:
wirelessly receive at least one message associated with a Short Message Service (SMS), a Multimedia Message Service (MMS), an e-mail or a Social Network Service (SNS);
upon occurrence of both the reception of the at least one message and a detection of the engagement signal provided from the engagement unit, obtain an x-coordinate on the screen of the flexible display based on the tilt angle and a y-coordinate on the screen of the flexible display based on the rotation angle by referring to a database; and
display the at least one message at the determined x-coordinate and y-coordinate on the screen of the flexible display.

2. The portable terminal of claim 1, wherein the engagement unit includes a male connector in the first end and a female connector in the second end, and provides the engagement signal when the male connector and the female connector are electrically connected to each other.

3. The portable terminal of claim 1, wherein the first end includes a switch and the second end includes a member configured to turn on the switch, and upon the engagement, the member is configured to turn on the switch, providing the engagement signal.

4. The portable terminal of claim 1, wherein the first end includes a second sensor and the second end includes a member configured to trigger the second sensor, and upon the engagement, the sensor second is triggered by the member of the second sensor, providing the engagement signal.

5. The portable terminal of claim 4, wherein the second sensor is one of a magnetic sensor, a proximity sensor or a photo sensor.

6. A method for displaying on a portable terminal comprising a flexible and rectangular display with four sides including opposite first and second sides, opposite third and fourth sides, and an engagement unit comprising first and second ends respectively adjacent to the first and second sides, wherein the engagement unit is configured to generate an engagement signal when the first end is engaged with the second end and the portable terminal with the flexible display deformed into a curved shape, the method comprising:
when the engagement signal is generated:
measuring a tilt angle that the deformed portable terminal is tilted toward the third side or the fourth side; and
measuring a rotation angle that the deformed portable terminal is rotated in a clockwise or counterclockwise with respect to a rolling motion with the curved shape of the portable terminal;

wirelessly receiving at least one message associated with a Short Message Service (SMS), a Multimedia Message Service (MMS), an e-mail and a Social Network Service (SNS);

upon occurrence of both the reception of the at least one message and the determination that the portable terminal is bent around, obtaining a x-coordinate on the screen of the flexible display based on the tilt angle and a y-coordinate on the screen of the flexible display based on the rotation angle by referring to a database; and displaying the at least one message at the x-coordinate and y-coordinate on the screen of the flexible display.

7. The method of claim 6, wherein the engagement unit includes a male connector in the first end and a female connector in the second end, and the engagement signal is generated when the male connector and the female connector are electrically connected to each other.

8. The method of claim 6, wherein the first end includes a switch and the second end includes a member configured to turn on the switch, and upon the engagement, the member is configured to turn on the switch, generating the engagement signal.

9. The method of claim 6, wherein the first end includes a sensor and the second end includes a member configured to trigger the sensor, and upon the engagement, the sensor is triggered by the member of the sensor, generating the engagement signal.

10. The method of claim 9, wherein the sensor is one of a magnetic sensor, a proximity sensor or a photo sensor.

11. The portable terminal of claim 1, wherein the x-coordinate for displaying the at least one message is moved in a direction from the third side to the fourth side when the deformed portable terminal is tilted toward the third side, and wherein the x-coordinate for displaying the at least one message is moved in a direction from the fourth side to the third side when the deformed portable terminal is tilted toward the fourth side.

12. The portable terminal of claim 1, wherein the y-coordinate for displaying the at least message is moved in a direction from the first side to the second side when the deformed portable terminal is rotated in a clockwise with respect to the rolling motion with the curved shape of the portable terminal, and wherein the y-coordinate for displaying the at least message is moved in a direction from the second side to the first side when the deformed portable terminal is rotated in a counterclockwise with respect to the rolling motion with the curved shape of the portable terminal.

13. The portable terminal of claim 1, wherein the sensor includes a gravity sensor.

14. The portable terminal of claim 1, wherein the portable terminal is a wearable device.

15. The portable terminal of claim 1, further comprising a communication unit for transmitting and receiving a radio signal associated with a video communication, an audio communication or a data communication.

16. The portable terminal of claim 1, further comprising at least one of a speaker, a microphone and a camera.

17. The portable terminal of claim 1, further comprising an input unit for receiving a user input.

18. The method of claim 6, wherein the x-coordinate for displaying the at least one message is moved in a direction from the third side to the fourth side when the deformed portable terminal is tilted toward the third side, and wherein the x-coordinate for displaying the at least one message is moved in a direction from the fourth side to the third side when the deformed portable terminal is tilted toward the fourth side.

19. The method of claim 6, wherein the y-coordinate for displaying the at least message is moved in a direction from the first side to the second side when the deformed portable terminal is rotated in a clockwise with respect to the rolling motion with the curved shape of the portable terminal, and wherein the y-coordinate for displaying the at least message is moved in a direction from the second side to the first side when the deformed portable terminal is rotated in a counterclockwise with respect to the rolling motion with the curved shape of the portable terminal.

20. The method of claim 6, wherein the portable terminal is a wearable device.

* * * * *